Dec. 24, 1940. C. T. PEACOCK Re. 21,675

DAMMING DEVICE FOR LISTERS

Original Filed April 7, 1936 2 Sheets-Sheet 1

INVENTOR.
CHARLES T. PEACOCK
BY
ATTORNEY.

Dec. 24, 1940. C. T. PEACOCK Re. 21,675
DAMMING DEVICE FOR LISTERS
Original Filed April 7, 1936 2 Sheets-Sheet 2
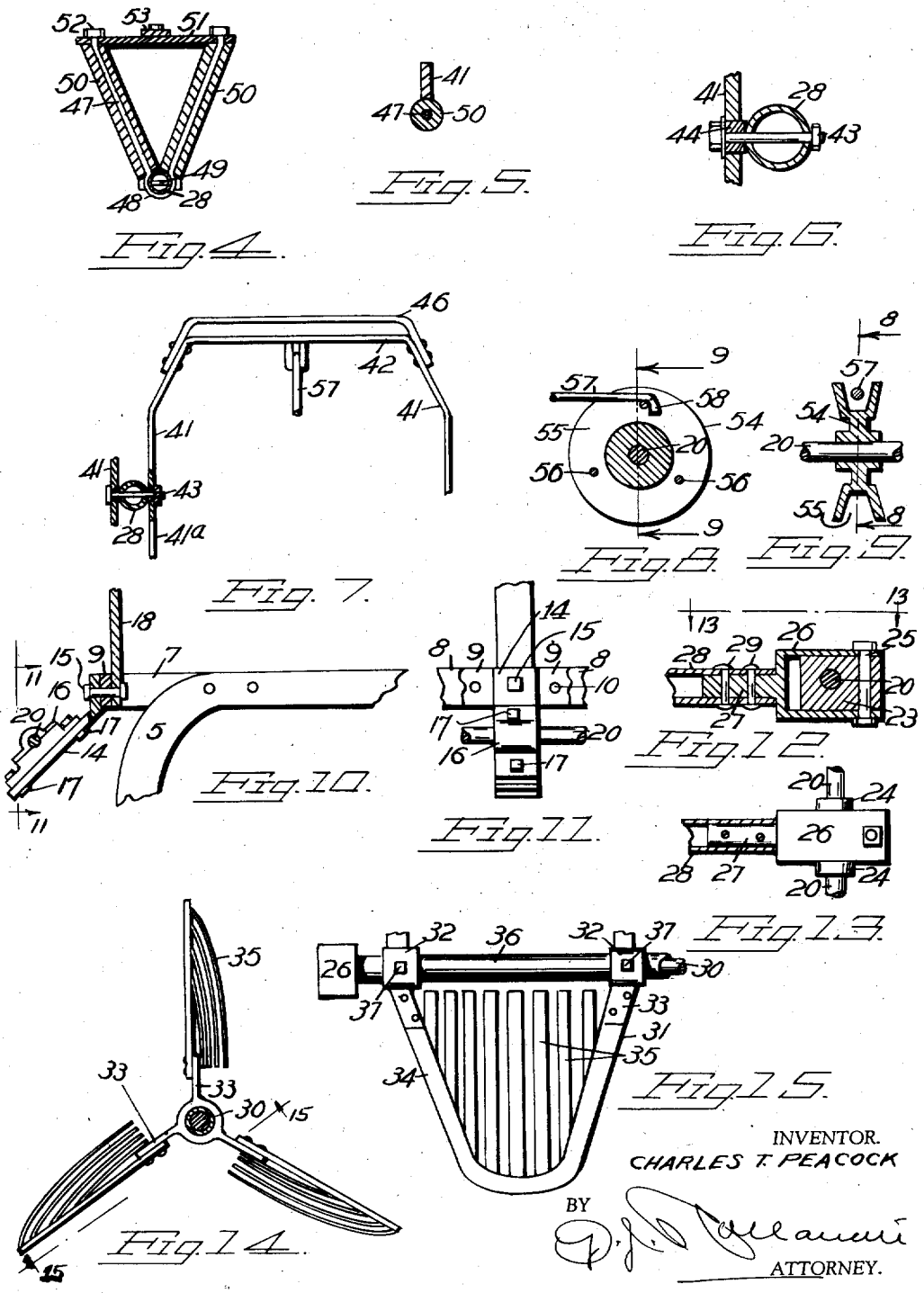
INVENTOR.
CHARLES T. PEACOCK
BY
ATTORNEY.

Reissued Dec. 24, 1940

Re. 21,675

UNITED STATES PATENT OFFICE 21,675

DAMMING DEVICE FOR LISTERS

Charles T. Peacock, Arriba, Colo.

Original No. 2,103,116, dated December 21, 1937, Serial No. 73,101, April 7, 1936. Application for reissue April 8, 1938, Serial No. 202,718

63 Claims. (Cl. 97—55)

This invention relates to improvements in dam forming devices for listers and is an improvement on the invention shown, described and claimed in U. S. Letters Patent 1,892,002 granted to me December 27, 1932.

It is an object of this invention to produce a damming device, of the type identified, which shall be especially adapted for contour farming in places where the land is rolling and which makes it unnecessary to run level lines to determine the path of the lister.

Another object is to produce a damming device that can be attached to listers of ordinary construction without making it necessary to change the lister in any way.

A further object relates to the provision whereby the damming scrapers can swing laterally relative to the lister so that the scraper blades may follow in the furrows formed by the lister when going around curves.

A further object is to produce a damming device of such construction that the dam forming scrapers can operate independently of each other.

A still further object is to produce a damming device in which the distance between the dams can be easily altered so as to adjust the machine for the terrain where it is operating.

Another object of this invention is to produce a damming scraper of such construction that it will prevent clogging and readily clear itself at each dam.

The above and any other objects that may appear as the description proceeds, are attained by means of a construction and an arrangement of parts that will now be described in detail and for this purpose reference will be had to the accompanying drawings in which the device has been illustrated and in which, Figure 1 is a top plan view showing portions of an ordinary lister and my improved damming device attached thereto;

Figure 4 is a section taken on a line corresponding to line 4—4 Figure 3, and indicated by line 4—4 Figure 1;

Figure 5 is a section taken on line 5—5 Figure 3;

Figure 6 is a section taken on line 6—6, Figure 3;

Figure 7 is a view of the upper portion of the damming shovel detent or pawl, taken on line 7—7 Figure 3;

Figure 8 is a section taken on line 8—8 Figure 1, and shows the detent releasing cam;

Figure 9 is a section taken on line 9—9 Figure 8;

Figure 10 is a section taken on line 10—10 Figure 1;

Figure 11 is a view looking in the direction of arrow 11 in Figure 10;

Figure 12 is a view, partly in section, taken on line 12—12 Figure 1;

Figure 13 is a view looking in the direction of arrow 13 Figure 12;

Figure 14 is a view taken on line 14—14 Figure 1, showing the damming scraper assembly, and Figure 15 is a view looking in the direction of arrow 15 Figure 14.

Figure 1:
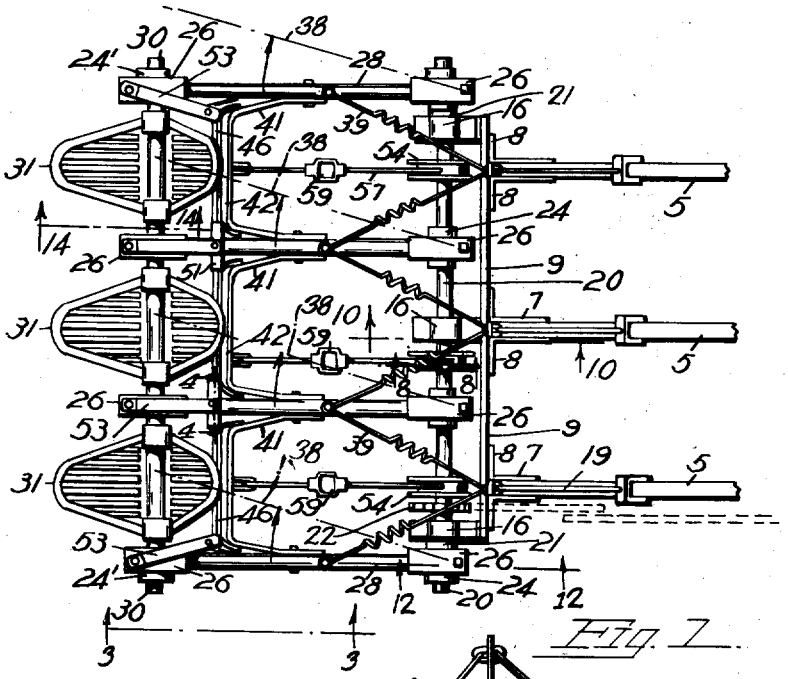

In the drawings the lister to which the damming device is attached is represented by a few parts only as the invention to which this application relates is an attachment. The lister is represented in part by the three beams or shanks numbered 5, which are spaced 20 inches apart instead of the usual distance of 40 inches. Each beam is provided with a long narrow chisel 6 which varies in size from six by sixteen inches for ordinary and four by sixteen inches for deep tilling. The shanks are provided with brackets 7 whose rear ends turn outwardly as indicated by numeral 8 and to the out turned ends a flat steel bar 9 is secured by bolts or rivets 10. (See Fig. 11.) The shanks carry the ordinary axle 11 to which the wheels 12 are attached. One wheel carries a sprocket 13 by means of which power is transmitted by a suitable sprocket chain shown dotted. The parts just described designate the lister. Three shanks only have been shown, but any suitable number from one to six or more can be used.

The attachment comprises a number of angular steel brackets 14, shown most clearly in Figures 10 and 11. One bracket is positioned directly back of each shank 5, except at the ends where they are positioned at the ends of the bar 9. The brackets are secured in place by bolts 15 and carry bearings 16 removably secured thereto by bolts 17. At the rear of each shank a vertically extending bar 18 is positioned and connected with the shank by means of a brace 19. A shaft 20 is journaled in bearings 16 and is held from moving longitudinally by two or more collars 21.

Shaft 20 carries a sprocket wheel 22 that is connected with the sprocket wheel 13 by means of suitable sprocket chains and idlers, indicated by dotted lines. Rotatably connected with shaft 20 are a number of bearings 23 (see Figures 12 and 13); there is one more bearing 23 than shanks. These bearings are held from longitudinal movement by means of collars 24. Each bearing 23 has, in addition to the horizontally extending opening for the shaft 20, a vertically disposed hole for the reception of a pivot bolt 25. Embracing each bearing block 23 is a forked connector having spaced parallel arms 26, between which the bearing block is positioned and to which it is attached by the bolt 25 for lateral swinging movement relative to the bearing block 23. Each connector has a shank 27 to which a pipe 28 is attached by bolts or rivets 29. The other ends of pipes 28 are provided with similar bearing blocks which carry a second shaft 30, spaced rearwardly from, and substantially parallel to the shaft 20.

Collars 24' are preferably secured to the ends of shaft 30 to prevent the end bearings from moving outwardly. By virtue of the pivotal connections of the connectors 26 at each end of the parallel arms 28 to the bearing blocks 23 on the two shafts 20, 30, the rearward shaft 30 is swingable laterally relative to the forward shaft 20 and is maintained parallel thereto. Mounted for rotation on shaft 30, between each pair of bearing blocks is a three bladed damming scraper, the blades of which have been designated by numeral 31. The construction of the damming scraper assembly is shown with considerable particularity in Figures 14 and 15 from which it will be seen that it consists of two hubs 32, each having three radial arms 33, spaced 120 degrees apart. The blades are formed from a substantially U-shaped peripherally extending steel scraper bar 34 whose ends are riveted or bolted to the arms 33. A number of flat bars or prongs 35 are secured at their outer ends to the curved bar 34 being preferably welded thereto and extending inwardly toward the axis of the scraper substantially parallel to each other and unsupported on the inner ends thereof. The bars 35 thus define a spoon-shaped working face on each scraper blade.

A piece of shelby tubing 36 extends through the hubs 32 and is held in position by set screws 37. The tubes 36 serve as bearings and extend between adjacent bearings in the manner shown in Figure 15. Since each scraper blade assembly is mounted on a separate piece of tubing 36, the assemblies are independently rotatable on the shaft 30. Attention is called at this point to the fact that the frame comprising the shafts 20 and 30 and the hollow bars 28 can be moved about bolts 25 as pivots, to form rectangular parallelograms and to either side of the center so as to form rhomboids; this movement being indicated by arrows 38 in Figure 1. The lateral movement just referred to makes it possible to operate the lister and damming device on curved paths so as to follow contour lines on hilly or rolling terrain.

In the construction shown in my prior patent above identified, the frame of the damming device is rigid and the machine must therefore be operated in straight or nearly straight paths.

Figure 2:
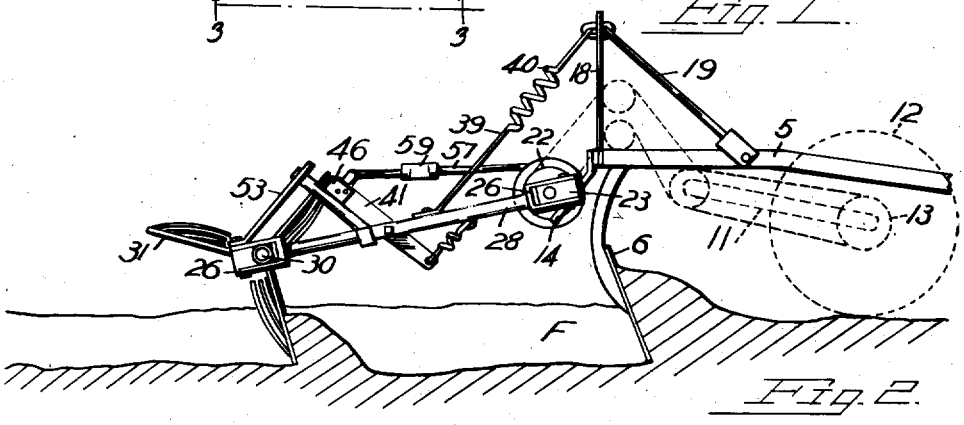
Figure 2 is an end elevation of the assembly shown in Figure 1.

The weight of the frame of the damming attachment is partly supported by means of tension members 39 and springs 40; the former being attached to the tubular bars 28 and the latter to the upright 18 supported on the bar 9 of the frame, as shown in Figures 1 and 2. The supporting springs thus extend diagonally upwardly and diagonally laterally so that they not only act to partially support the weight of the damming device for regulating the pressure of the blade against the ground to determine the rate of accumulation of soil for a dam, but also bias the latter toward a position in longitudinal alignment with the frame, with the scraper blades 31 directly behind the lister bottoms 6.

The rotation of each of the scraper blade assemblies is controlled by an individual escapement mechanism which will now be described. U-shaped detent members, each comprising a flat bar having sides 41 connected by a straight portion 42, have their sides pivoted to adjacent bars 28 by means shown in Figures 6 and 7. A bolt 43 extends diametrically through the tubular member 28 and is provided with one or more bushings 44 which are positioned in openings in the sides 41. By the construction described the bolts can be tightened without clamping the detents or interfering with their free movement.

Figure 3:
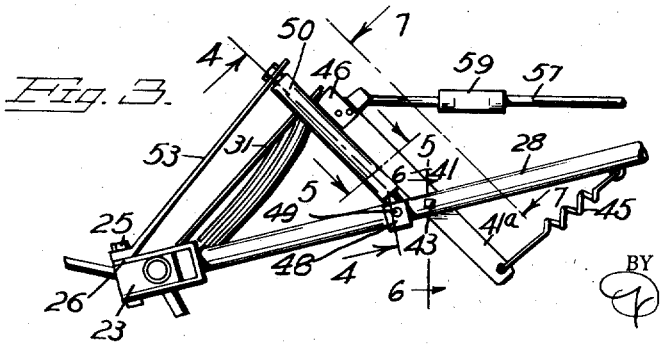
Figure 3 is a fragmentary side elevation taken along line 3—3 Figure 1.

One end 41a of each detent projects downwardly below the tubular bars 28 and is secured to the latter by means of a spring 45 (Figure 3). Attached to each detent is a bar 46 of spring steel, as shown in Figure 7; the purpose of this is to cushion the shock caused by stopping the rotation of the scraper blade assembly.

The counter-clockwise (Figure 3) rotation of the detent is limited by a stop which will now be described. Secured to each tubular bar 28 is a U-shaped member (see Figure 4) having round side members 47 connected at their centers by a flat portion 48 which is curved about bar 28 and secured to it by a bolt or rivet 49. Each side arm 47 carries a cylindrical resilient member 50 formed from rubber or rubberized fabric properly vulcanized. The stops are angularly inclined and so positioned that they lie in the paths of sides 41 and parallel with them when the parts are in operative position, shown in Figures 2 and 3. The outer ends of bolts 47 are connected by a bar 51, held in place by nuts 52, and a brace 53 is connected with the bar 51 and with a bolt 25. The detent is so positioned that when it is in the operative position, shown in Figures 1, 2, and 3, the bar 46 will be engaged by the scraper blade and will hold said scraper from turning about shaft 30.

It has previously been pointed out that shaft 20 is rotated from one of the wheels 12 and there is secured to shaft 20 three cam wheels 54, one for each scraper and detent. One of the cam wheels is shown in section in Figures 8 and 9 from which it will be seen that it is provided in its periphery with a deep groove 55. One or more pins 56 extend across the groove a short distance from the bottom thereof.

A rod 57 has one end attached to the detent 42 and the other end provided with a hook 58 that rests in the groove 55. When shaft 20 and cams 54 rotate clockwise (Figure 8) the pin 56 engages the hook 58 and pulls the rod upwardly thereby moving the detent from operative to inoperative position. As soon as the detent is removed the scraper blade assembly starts rotating. As cam wheel 54 continues to rotate the bar 57 will engage the bottom of the groove and the pin 56 will move out of engagement with the hook thereby releasing the detent which is returned to operative position by the action of spring 45. A turnbuckle 59 serves to adjust the length of the rod 57 so as to secure the proper movement of the detent. Instead of a single pin 56 two or more pins can be employed and spaced equiangularly and in this way as many releases of the damming blade assembly, per revolution of shaft 20, can be had as may be necessary. It is seldom that more than two pins would be practical or necessary.

Referring now more particularly to Figure 2 it will be seen that the chisel 6 cuts a deep furrow F and following in the furrow is a damming scraper blade which gathers the loose dirt for the dam. The trip mechanism is so timed that when a sufficient amount of dirt has been gathered to make a dam as high as the wall of the furrow, the detent will be pulled out from blade engaging position, whereupon the blades will rotate. The detent is released almost immediately thereafter and is in position to engage the next blade.

It has been found that three blades placed 120 degrees apart are the proper number to be used because if two blades are used sufficient rotation will not be effected to bring the other blade into operative position and if more than three blades are used the blade to be next moved to operative position will carry along a portion of the dirt gathered for the dam.

The distance between the dams is determined by the speed ratio between the wheel 12 and shaft 20 and the number of pins 56, and is usually so calculated that the dams are between 3 and 5 feet apart. On flat land the dams can be spaced much farther apart than where the land is inclined.

It is evident that when the lister furrows are inclined in the direction of their length the dams must be positioned quite close together to prevent the water from flowing from one depression to another.

The open construction of the damming blade prevents dirt from accumulating thereon and produces better operation and easier draft than if solid sheet metal blades were used.

Shaft 30 can rotate in its bearings if desired but the scraper blade assemblies are rotatable on the shaft so as to secure independent action.

Having described the invention, what I claim as new is:

1. In a damming attachment for listers, a frame having two spaced parallel shafts, one of which is rotatably connected with the lister, rotary scraper blade assemblies supported on the other of said shafts, means controlled by the rotation of said one shaft for alternately restraining and releasing for rotation said blade assemblies, an equal number of similarly spaced bearings on each shaft, corresponding bearings forming pairs, a bar connected between the bearings of each pair and a pivoted connection between the ends of the bars and the bearings whereby the frame formed by the shafts and the bars can be shifted from a rectangular parallelogram to a rhomboid.

2. A damming attachment for a lister provided with a bar extending across the rear thereof, said attachment comprising in combination, a shaft rotatably supported from the bar, a second shaft positioned a short distance to the rear of the first shaft, a plurality of bearings on each shaft, the bearings being similarly spaced on the two shafts so as to form pairs, a bar connecting the bearings of each pair, the bars being of equal length whereby a plurality of parallelograms are defined by the shafts and bars, whose shape can be varied from that of rectangular to oblique angled, a plurality of scraper blade assemblies rotatably mounted on the rear shaft, for independent rotation, a detent for each assembly, pivoted to the bars, and means operated by the rotation by the front shaft for periodically moving the detent to permit a rotation of the assembly.

3. A lister damming attachment, comprising, in combination, two spaced parallel shafts, an equal number of bearing blocks carried by each shaft, and similarly spaced so as to form pairs, bars of equal length for connecting the blocks of each pair, the bars being pivotally connected with the blocks, whereby a plurality of parallelograms are formed whose shapes can be changed from rectangular to rhomboidal, a section of pipe rotatably mounted on one of said shafts, between each two adjacent bearings, a scraper blade assembly carried by each pipe section, each assembly comprising a plurality of radially extending blades, a detent mechanism pivoted to the bars on opposite sides of the assembly and means comprising a cam carried by the other shaft for moving the detent to inoperative position as the cam is rotated.

4. A damming attachment for listers, comprising, in combination, a shaft, means rotatably connected therewith for supporting it from a lister, a plurality of bearings carried by the shaft, a second shaft spaced from and substantially parallel with the first shaft, a number of bearings equal to the number on the first shaft, carried by the second shaft, the bearings being similarly positioned on both shafts, bars connecting corresponding bearings, the bearings being pivotally connected with the ends of the bars, the bars and shafts forming parallelograms which may be changed from rectangular to rhomboidal, one shaft having tubular spacers between adjacent bearings, scraper blade assemblies on the tubular spacers, a detent mechanism for each assembly and means controlled by the rotation of the shaft carried by the lister for operating the detent.

5. A damming attachment for listers, comprising, two parallel shafts, each shaft having two spaced bearings, bars connecting corresponding bearings, a pipe rotatably mounted on one shaft between the bearings, two spaced hubs on the pipe, each hub having a plurality of radial arms, a flat bar of substantially U-shape connected with each pair of arms, each U-shaped bar having a plurality of parallel spaced bars secured thereto at one end, a detent carried by the bars connecting the bearings, and means controlled by the rotation of the other shaft for moving the detent.

6. A scraper blade assembly for use with a lister damming attachment, comprising two hubs each having a plurality of radial arms, a flat bar of U-shape, for each pair of arms, the ends of the U-shaped bar being connected with the arms and a plurality of flat bars connected at one end with the U-shaped bar.

7. A damming attachment for listers, comprising a frame having fore and aft spaced parallel shafts, the front one of which is rotatably connected with the lister, an equal number of similarly spaced bearings on each shaft, corresponding bearings forming pairs, a bar connected between the bearings of each pair and a pivotal connection between the ends of the bars and the bearings, whereby the frame formed by the shafts and the bars can be shifted from a rectangular parallelogram to a rhomboid, rotary scraper blade assemblies supported on the rear shaft, and means controlled by the rotation of said front shaft for alternately restraining and releasing for rotation said blade assemblies.

8. A scraper blade assembly for use with a lister damming attachment, comprising two hubs each having three radial arms spaced substantially 120° apart, a flat U-shaped bar for each pair of arms, the ends of the U-shaped bar being connected to the arms, and a plurality of flat bars attached to each of said U-shaped bars.

9. An implement comprising a frame, a ground-working tool carried thereby adapted to form a furrow as the implement is drawn forwardly, a damming device including a scraper disposed to operate in the furrow made by said ground-working tool, and means for connecting said device to said implement frame whereby said scraper is free to follow in said furrow when said implement is drawn in an irregular path, said connecting means being adapted to maintain a constant angular relation between said scraper and said frame.

10. An implement comprising a frame, a plurality of transversely spaced ground-working tools adapted to form parallel furrows as the implement is drawn forwardly, a damming device comprising a transverse support, parallel links pivotally connected to said support and to said frame whereby said support is free to swing laterally, and a plurality of scrapers disposed on said support and disposed to travel in the furrows formed by said ground-working tools.

11. An implement comprising a frame, a ground-working tool carried thereby adapted to form a furrow as the implement is drawn forwardly, a damming device comprising a scraper disposed rearwardly of said ground-working tool and disposed to operate in the furrow formed thereby, a support for said scraper, and a pair of parallel links pivotally connected to said support and to said frame to permit said support to swing laterally with respect to said frame responsive to the guiding action of said scraper in the furrow.

12. An implement comprising a frame, a ground-working tool carried thereby adapted to form a furrow as the implement is drawn forwardly, a damming device including a rotatable scraper assembly disposed to operate in the furrow made by said ground-working tool, said assembly comprising a plurality of blades extending radially from the axis of rotation, and detent mechanism therefor, and means for connecting said device to said implement frame whereby said scraper is free to follow in said furrow when said implement is drawn in a curved path.

13. An implement comprising a frame, a plurality of ground-working tools carried thereby adapted to form furrows as the implement is drawn forwardly, a damming device including a plurality of independently rotatable scraper assemblies disposed to operate in the furrows made by said ground-working tools, each of said assemblies comprising a plurality of blades extending radially from the axis of rotation, and detent mechanism therefor, and means for connecting said scrapers to said implement frame permitting said scrapers to follow in their respective furrows when said implement is drawn in an irregular path.

14. An implement comprising a frame, a ground-working tool carried thereby adapted to form a furrow when the implement is drawn forwardly, a damming device including a scraper disposed to operate in the furrow made by said ground-working tool, means for connecting said device to said implement frame, said connecting means providing for free lateral and vertical movement of said device relative to said frame, and spring-mounted supporting means for at least partially supporting said device on said frame.

15. An implement comprising a frame, a plurality of transversely spaced ground-working tools adapted to form parallel furrows as the implement is drawn forwardly, a damming device comprising a transverse support, a damming scraper for each of said tools mounted on said support, means pivotally connecting said support to said frame permitting free lateral and vertical movement of said support relative to said frame, and spring-mounted supporting means for at least partially supporting said support on said frame.

16. An implement comprising a frame, a ground-working tool carried thereby to form a furrow as the implement is drawn forwardly, a damming device including a rotatable scraper assembly, said assembly comprising a plurality of blades extending radially from the axis of rotation, said blades being adapted to lightly scrape the sides of said furrow, one blade at a time, to accumulate dirt in front of the blade for making a dam, and resilient means for regulating the pressure of said scraper assembly upon the sides of the furrow, to limit the rate of accumulation of dirt.

17. An implement comprising a frame, a plurality of transversely spaced ground-working tools adapted to form parallel furrows as the implement is drawn forwardly, a damming device comprising a transverse support, means pivotally connecting said support relative to said frame, a plurality of rotatable scraper assemblies disposed on said support, said assemblies each comprising a plurality of blades extending radially from the axis of rotation, each of said scraper assemblies being adapted to accumulate dirt from the sides of one of said furrows, respectively, and spring means for determining the depth of operation to determine the rate of accumulation of dirt.

18. In a lister damming device, a rotatable scraper assembly comprising three blades extending outwardly radially from the axis of rotation, spaced 120° apart, each of said blades comprising a peripherally extending scraping bar and means providing a working face carried on said bar, said face being concave in both radial and axial directions.

19. A scraper blade for a lister damming device, said blade comprising a peripherally extending scraping member and a spoon-shaped working face at least partially encircled by said scraping member.

20. A scraper blade for a lister damming device, said blade comprising a peripherally extending scraping member and a plurality of curved bars extending inwardly therefrom, said bars defining a spoon-shaped working face.

21. An implement comprising a frame, a ground-working tool carried thereby adapted to form a furrow as the implement is drawn forwardly, a damming device comprising a support disposed rearwardly of said ground-working tool, a pair of parallel links pivotally connected to said support and to said frame to permit said support to swing freely laterally with respect to said frame, means for at least partially supporting said support resiliently on said frame, and a scraper carried by said support and disposed to operate in the furrow formed by said ground-working tool.

22. An implement comprising a frame, a ground-working tool carried thereby adapted to form a furrow when the implement is drawn forwardly, a damming device including a scraper disposed to operate in the furrow made by said ground-working tool, means for connecting said device to said implement frame, said connecting means providing for free lateral and vertical movement of said device relative to said frame, and spring-mounted supporting means for at least partially supporting said device on said frame and for biasing the damming device toward a position in longitudinal alignment with said frame.

23. An implement comprising a frame, a plurality of transversely spaced ground-working tools adapted to form parallel furrows as the implement is drawn forwardly, a damming device comprising a transverse support, means pivotally connecting said support to said frame permitting free lateral and vertical movement of said support relative to said frame, and supporting means for at least partially supporting said support on said frame and for biasing said damming device toward a predetermined normal position relative to said frame, said supporting means including springs extending diagonally upwardly and diagonally laterally from said damming device.

24. An implement comprising a frame, a ground-working tool carried thereby adapted to form a furrow when the implement is drawn forwardly, a damming device including a scraper disposed to operate in the furrow made by said ground-working tool, means for connecting said device to said implement frame, said connecting means providing for free lateral and vertical movement of said device relative to said frame, and supporting means for at least partially supporting said device on said frame continuously during scraping operation.

25. An implement comprising a frame, a plurality of transversely spaced ground-working tools adapted to form parallel furrows as the implement is drawn forwardly, a damming device comprising a transverse support, a damming scraper disposed to operate in the furrow made by each of said tools mounted on said support, means pivotally connecting said support to said frame providing free lateral and vertical movement of said support relative to said frame, and means for restraining downward movement of said support relative to said frame.

26. An implement comprising a frame, a ground-working tool carried thereby to form a furrow as the implement is drawn forwardly, a damming device including a rotatable scraper assembly, said assembly comprising at least one scraper blade extending radially from the axis of rotation, adapted to scrape the sides of said furrow to accumulate dirt in front of the blade for making a dam, and resilient means connecting said device to the frame and acting upwardly on said device to limit the rate of accumulation of dirt by said device.

27. An implement comprising a frame, a plurality of transversely spaced ground-working tools adapted to form parallel furrows as the implement is drawn forwardly, a damming device comprising a transverse support, means pivotally connecting said support relative to said frame, a plurality of rotatable scraper assemblies disposed on said support, said assemblies each comprising at least one scraper blade extending radially from the axis of rotation, each of said scraper assemblies being adapted to accumulate dirt from the sides of one of said furrows, respectively, and resilient means for restraining downward movement of said scrapers relative to said frame for limiting the rate of accumulation of dirt.

28. An implement comprising a frame, a ground-working tool carried thereby adapted to form a furrow as the implement is drawn forwardly, a damming device including a rotatable scraper assembly disposed to operate in the furrow made by said ground-working tool, said assembly comprising a plurality of blades extending radially from the axis of rotation, and means for connecting said device to said implement frame whereby said scraper is free to follow in said furrow when said implement is drawn in a curved path.

29. An implement comprising a frame, a plurality of ground-working tools carried thereby adapted to form furrows as the implement is drawn forwardly, a damming device including a plurality of independently rotatable scraper assemblies disposed to operate in the furrows made by said ground-working tools, each of said assemblies comprising a plurality of blades extending radially from the axis of rotation, and means for connecting said scrapers to said implement frame permitting said scrapers to follow in their respective furrows when said implement is drawn in an irregular path.

30. An implement comprising a frame, a ground-working tool carried thereby adapted to form a furrow when the implement is drawn forwardly, a damming device including a scraper disposed to operate in the furrow made by said ground-working tool, means for connecting said device to said implement frame, said connecting means providing for free lateral and vertical movement of said device relative to said frame, and means for biasing the damming device toward a position in longitudinal alignment with said frame.

31. An implement comprising a frame, a ground-working tool carried thereby adapted to form a furrow when the implement is drawn forwardly, a damming device including a scraper disposed to operate in the furrow made by said ground-working tool, means for connecting said device to said implement frame, said connecting means providing for free lateral and vertical movement of said device relative to said frame, and means for yieldingly resisting lateral swinging.

32. An implement comprising a frame, a furrow forming tool carried thereby, a damming device including a rotatable scraper assembly disposed to operate in the furrow made by said tool, said assembly comprising a plurality of blades extending radially from the axis of rotation, and detent means therefor, means for connecting said device to said implement frame, said connecting means providing for lateral and vertical swinging movement of said device relative to said frame, and means for yieldingly resisting said lateral swinging movement.

33. An implement comprising a frame, a ground-working tool carried thereby, a rotatable scraper assembly comprising a plurality of blades extending substantially radially from the axis of rotation, a draft beam connected thereto, means for pivotally connecting said draft beam to said frame for lateral swinging with respect thereto, detent means mounted on said pivoted draft beam, for preventing rotation of said rotatable assembly, and means for intermittently disabling said detent means.

34. An implement comprising a frame, a ground-working tool carried thereby, a rotatable scraper assembly comprising a plurality of blades extending substantially radially from the axis of rotation, a draft beam connected thereto, means for pivotally connecting said draft beam to said frame for lateral swinging with respect thereto, and means mounted on said beam for alternately detaining and releasing said rotatable scraper assembly with respect to rotary movement about its axis of rotation.

35. An implement comprising a frame, a plurality of ground-working tools carried thereby, a plurality of rotatable scraper assemblies disposed rearwardly of said tools, each assembly comprising a plurality of substantially radially extending blades disposed about a transversely extending axis of rotation, draft beams for said scraper assemblies, means for pivotally connecting said beams to said frame for lateral swinging with respect thereto, and detent means mounted on said pivoted draft beams for preventing rotation of said rotatable assemblies, said detent means being intermittently disabled to permit rotation of said assemblies.

36. In combination, a frame, a plurality of independently rotatable damming scrapers disposed rearwardly of said frame, at least one draft beam connected to each of said scrapers, means for pivotally connecting said beams to said frame for lateral swinging relative thereto, and an individual disengageable detent for each of said rotary scrapers for restraining the latter against rotation.

37. In combination, a frame, a plurality of independently rotatable damming scrapers disposed rearwardly of said frame, each of said scrapers comprising three radially extending blades spaced 120° apart about a transversely extending axis of rotation, at least one draft beam connected to each of said scrapers, means for pivotally connecting said beams to said frame for lateral swinging relative thereto, and an individual disengageable detent for each of said rotary scrapers for restraining the latter against rotation.

38. In combination, a frame, a plurality of independently rotatable damming scrapers disposed rearwardly of said frame, at least one draft beam connected to each of said scrapers, means for pivotally connecting said beams to said frame for both lateral and vertical swinging relative thereto, and an individual disengageable detent for each of said rotary scrapers, said detents being mounted on said pivoted beams.

39. An implement comprising a plurality of laterally spaced furrow forming tools, rotary damming scrapers disposed behind certain of said tools, respectively, to follow in the furrows formed thereby, each of said scrapers being independently rotatable, at least one draft beam for each of said rotary scrapers, means for pivotally connecting said beams to said tools for lateral swinging relative thereto, individual detent means associated with each of said rotary damming scrapers, said detent means being mounted on said draft beams, and means for individually disabling each of said detent means to permit rotation of said scrapers.

40. A scraper blade for a damming device, comprising a supporting bracket, a peripherally extending scraping member attached to said bracket, said scraping member including a pair of converging side portions and an end portion defining a blunt end on said blade, and means supported on said scraper member for retaining and accumulating material gathered by said scraping member.

41. In a scraper blade for a furrow damming device, a peripherally extending scraping bar including converging side portions disposed at an angle to each other that is approximately equal to the angle defined by the sides of the furrow, and means, supported on and extending between said side portions, for retaining and accumulating soil scraped from the sides of the furrow by said scraping bar.

42. A scraper blade for a furrow damming device comprising a peripherally extending supporting member and a plurality of bars defining a working face, each of said bars being supported at one end thereof on said supporting member and extending inwardly therefrom, the opposite ends of said bars being free.

43. In a rotary damming device, an axially disposed supporting member, a U-shaped peripherally extending scraping member, and a plurality of bars fixed at one end thereof to said peripheral member and extending substantially parallel to each other toward said axial supporting member, defining a working face, each of said bars being unsupported at one end thereof.

44. In combination with an implement including a frame, a damming device connected thereto and adapted to be drawn thereby, said damming device comprising a rotatable assembly of scraper blades extending radially from the axis of rotation, said blades being adapted to scrape the sides of a previously formed furrow, one blade at a time, to accumulate dirt in front of the blade for making a dam, and resilient means for regulating the pressure of said scraper assembly upon the sides of the furrow, to determine the rate of accumulation of dirt.

45. A damming device comprising in combination, a transverse supporting member, a plurality of rotatable scraper assemblies connected thereto, each of said assemblies comprising a plurality of blades extending radially from the axis of rotation and adapted to operate in a furrow to accumulate dirt from the sides thereof as the device moves forwardly, and spring means associated with each of said scraper assemblies for determining the depth of operation to determine the rate of accumulation of dirt.

46. In combination with an implement comprising a frame, a damming device comprising a transverse support, scrapers disposed on said support and adapted to travel in pre-formed furrows, parallel links pivotally connected at one end to said support and universal joint means for connecting the opposite ends of said links to said frame, said support being free to swing vertically and laterally responsive to the guiding action of said scrapers in the furrows.

47. In combination, a supporting frame, a damming device including an earth collecting blade, means for connecting said device to said frame, said connecting means providing for free lateral and vertical movement of said device relative to said frame, and spring mounted supporting means for at least partially supporting said device on said frame.

48. In combination, a supporting frame, a damming device comprising a support, an earth-collecting blade carried thereby, a pair of parallel links pivotally connected to said support and to said frame, permitting said support to swing freely laterally with respect to said frame, and means for at least partially supporting said support resiliently on said frame.

49. In combination, a supporting frame, a damming device including an earth collecting blade, means for connecting said device to said frame providing free lateral and vertical movement of said device relative to said frame, and means for continuously restraining downward movement of said device relative to said frame during earth collecting operation.

50. In combination, a supporting frame, a damming device including a rotatable assembly, comprising at least one earth engaging blade extending outwardly from the axis of rotation to accumulate earth for making a dam, and resilient means connecting said device to said frame for limiting downward movement of said device relative to the frame.

51. In combination, a frame, a damming device including a rotatable scraper assembly comprising a plurality of scraper blades extending radially from the axis of rotation, and means for pivotally connecting said device to said frame providing free lateral swinging of said device relative to said frame responsive to the guiding action of said scraper when it is operated in a pre-formed furrow.

52. In combination, a supporting frame, a damming device including a rotatable scraper assembly comprising a plurality of scraper blades extending outwardly from the axis of rotation, a draft beam for said scraper assembly, and means for pivotally connecting said draft beam to said frame, said connecting means providing free lateral and vertical swinging of said device relative to said frame responsive to the guiding action of said scraper assembly when it is operated in a pre-formed furrow.

53. In combination, a supporting frame, a damming device including a scraper blade, a draft beam therefor, means for pivotally connecting said device to said frame providing for free lateral and vertical swinging of said device relative to said frame, and means for yieldingly resisting lateral swinging.

54. In combination, a supporting frame, a damming device including a rotatable scraper assembly comprising a plurality of blades extending radially from the axis of rotation, means for pivotally connecting said device to said frame, said connecting means providing for free lateral and vertical swinging movement of said device relative to said frame, and means for yieldingly resisting said lateral swinging movement.

55. In combination, a supporting frame, a rotatable scraper assembly comprising a plurality of blades extending substantially radially from the axis of rotation, a draft beam connected to said scraper assembly, means for pivotally connecting said draft beam to said frame for lateral swinging with respect thereto, and means mounted on said beam for alternately detaining and releasing said rotatable scraper assembly with respect to rotary movement about its axis of rotation.

56. In combination with an implement including a frame, a damming device connected thereto and adapted to be drawn thereby, said damming device comprising a rotatable assembly having at least one scraper blade extending radially from the axis of rotation, said blade being adapted to scrape the sides of a previously formed furrow to accumulate dirt in front of the blade for making a dam, and resilient means for regulating the pressure of said scraper blade upon the sides of the furrow to determine the rate of accumulation of dirt.

57. A damming device comprising a scraper blade, draft means for drawing said blade in previously formed furrow to scrape the sides of said furrow and accumulate dirt in front of the blade, the latter being movable out of earth engaging position to deposit the dirt to form a dam in the furrow, and resilient means for regulating the pressure of said scraper blade upon the sides of the furrow to determine the rate of accumulation of dirt.

58. A damming device comprising a rotatable member including at least one soil engaging scraper blade extending generally radially from the axis of rotation, a drawbar connected to said member, draft means connected to said drawbar providing for vertical swinging movement of said drawbar relative thereto, and resilient means acting vertically against said drawbar to regulate the pressure of said scraper blade against the soil.

59. A damming device comprising a rotatable member having at least one soil engaging scraper blade extending generally radially from the axis of rotation, a drawbar connected to said member, draft means connected to said drawbar providing for vertical swinging movement of said drawbar relative thereto, means for alternately holding said member against rotation and releasing the latter whereby soil is accumulated in front of said scraper blade and deposited during rotation of the blade, and resilient means acting between said drawbar and said draft means to regulate the pressure of said blade against the soil for controlling the rate of accumulation of soil.

60. A damming device comprising draft means, a soil engaging scraper blade connected thereto and movable into and out of soil engaging position to alternately accumulate soil in front of said scraper blade as the latter advances, and deposit said soil in a pile, and a spring disposed to act vertically upon said blade to regulate the pressure thereof against the soil for controlling the rate of accumulation of soil in front of said blade.

61. In combination with an implement including a frame, a damming device connected thereto and adapted to be drawn thereby, said damming device comprising a scraper blade mounted for movement on a transverse axis, said blade being adapted to scrape the sides of a previously formed furrow, to accumlate dirt in front of the blade for making a dam, and resilient means for regulating the pressure of said scraper on the sides of the furrow, to determine the rate of accumulation of dirt.

62. A damming device comprising in combination a supporting member, a scraper blade connected thereto and mounted for swinging movement from a transverse axis and adapted to operate in a furrow to accumulate dirt from the sides thereof as the device moves forwardly, and spring means associated with the supporting member for controlling the depth of operation to determine the rate of accumulation of dirt.

63. A damming device comprising a draft member, a transversely disposed shaft supported on said draft member, a soil engaging scraper blade supported on said shaft and movable about the axis of said shaft between soil engaging and inoperative positions, draft means connected to said draft member providing for vertical swinging movement of said draft member relative thereto, and resilient means acting vertically against said draft member to regulate the pressure of said scraper blade against the soil.

CHARLES T. PEACOCK.